Oct. 23, 1923.

A. R. KEELER 1,471,898

CORN HUSKER AND THE LIKE

Filed Feb. 13, 1922     6 Sheets-Sheet 1

Inventor:
Alonzo R. Keeler:
By
Attys.

Oct. 23, 1923.

A. R. KEELER

CORN HUSKER AND THE LIKE

Filed Feb. 13, 1922

Inventor:
Alonzo R. Keeler
By Lanning & Lanning
Attys.

Oct. 23, 1923.  
A. R. KEELER  
1,471,898  
CORN HUSKER AND THE LIKE  
Filed Feb. 13, 1922  6 Sheets-Sheet 5
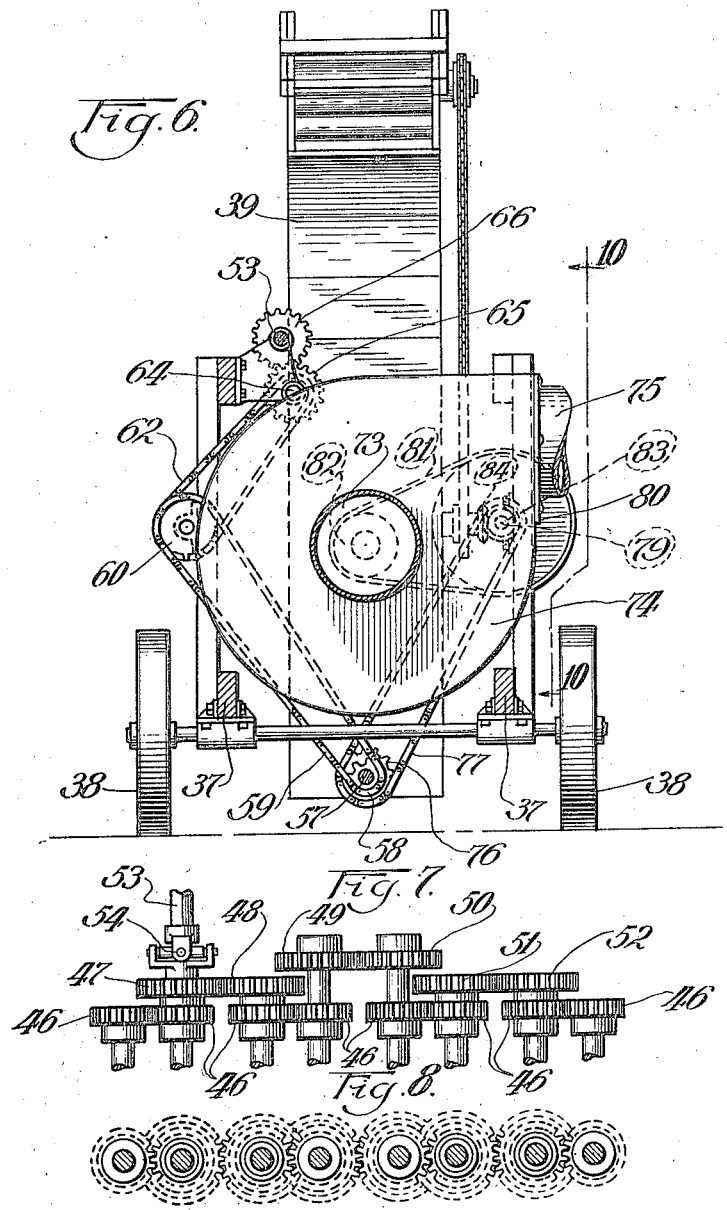

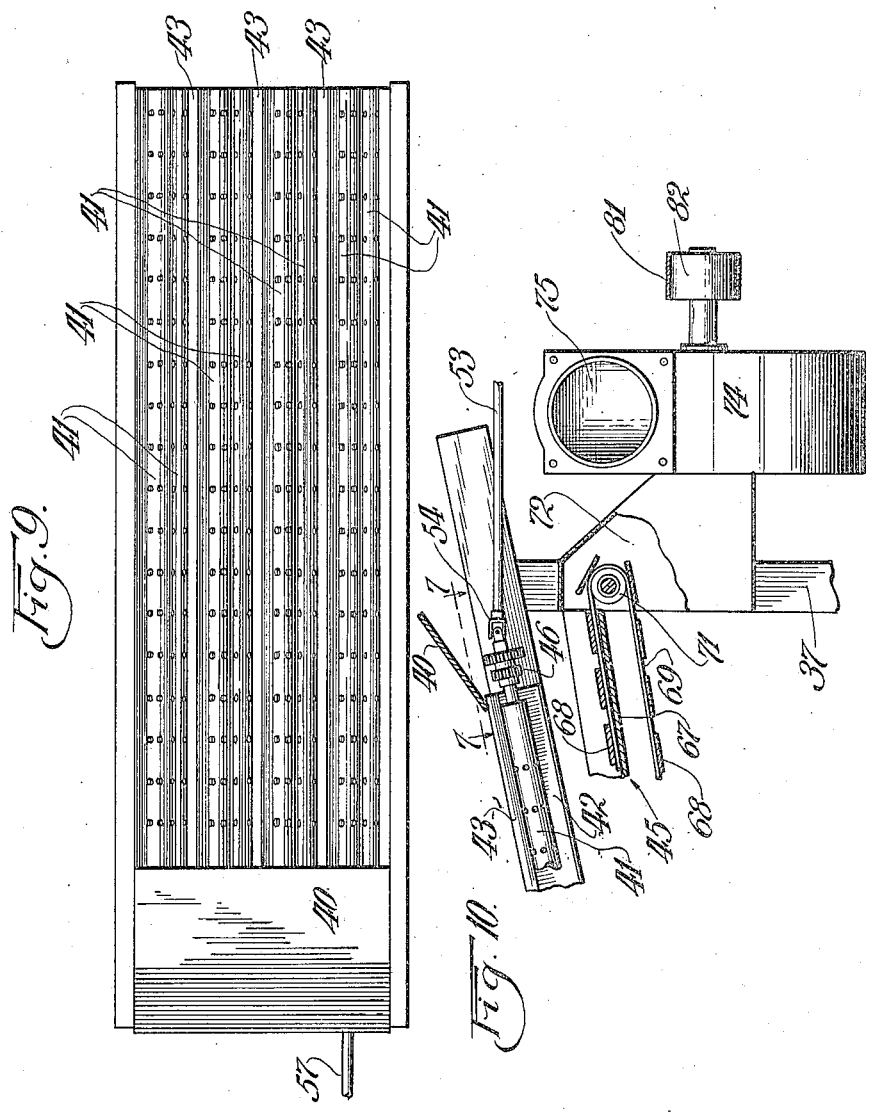

Patented Oct. 23, 1923.

1,471,898

UNITED STATES PATENT OFFICE.

ALONZO R. KEELER, OF ALTONA, ILLINOIS.

CORN HUSKER AND THE LIKE.

Application filed February 13, 1922. Serial No. 536,163.

*To all whom it may concern:*

Be it known that I, ALONZO R. KEELER, a citizen of the United States, residing at Altona, in the county of Knox and State of Illinois, have invented certain new and useful Improvements in Corn Huskers and the like, of which the following is a specification.

This invention has to do generally with improvements in corn huskers and similar machines. The corn huskers are used in general for the removal of the husks from the ears of corn. Ordinarily this operation is performed before the corn is sent to the bin or shed for storage.

It is quite customary in placing the corn in storage to make use of an elevating conveyor by means of which the corn is raised from the ground and delivered to the bin. It is also quite customary to deliver the unhusked corn from the field in wagons or trucks, and elevators have been provided for tilting the same at the destination so as to discharge the ears of corn into or adjacent to the elevating and conveying mechanism previously referred to. Ordinarily both the elevating and conveying mechanism and such wagon or truck tilting mechanism is operated mechanically and by power derived from a suitable source.

A familiar construction of such conveying and elevating mechanism and of such tilting mechanism is provided with suitable through shafts, so that the two mechanisms can be coupled together and driven from a common source of power. This facilitates the operations and simplifies the delivery of power to both mechanisms. Such an arrangement is, however, not provided with any husking mechanism, and is, therefore, not adapted for removing the husks from the ears of corn after they are delivered by the truck or wagon and before they reach the conveying and elevating mechanism.

The main object of the present invention is to provide in combination with such tilting mechanism and elevating and conveying mechanism suitable husking mechanism interposed between the two mechanisms aforesaid, so that the ears of corn, as they are delivered from the truck or wagon, will be automatically husked and then delivered to the elevating and conveying mechanism, so that all of the operations necessary and proper to deliver the husked corn into the bin may proceed in a natural and economical manner and automatically and without the necessity of special operations on the part of the workman other than generally overseeing the work and seeing that the machinery is functioning properly at all times.

More particularly an object of the present invention is to provide a corn husking mechanism capable of automatically performing the husking operation aforesaid, and which husking mechanism shall be provided with a through power shaft which may be coupled up with the through power shaft of the elevating and conveying mechanism at one end and with the through power shaft of the tilting mechanism and other associated parts at the other end, so that all of the mechanism may be simultaneously driven by power from a common source and in the simplest and most convenient manner possible.

Other objects of the invention are to provide improvements in the construction and mode of operation of corn huskers generally, and to provide machines of this type which shall be generally applicable for corn husking operations whether in combination with such tilting mehanism and such elevating mechanism or not.

Other objects and uses of the invention will appear from a detailed description of the same which consists in the features of construction and combinations of parts hereinafter described and claimed.

In the drawings:

Fig. 6 shows a vertical cross section taken on the line 6—6 of Fig. 4, looking in the direction of the arrows;

Fig. 7 shows a detail fragmentary plan view of the roll gears, being taken on the line 7—7 of Fig. 10, looking in the direction of the arrows;

Fig. 8 shows an end view corresponding to Fig. 7;

Fig. 9 shows a plan view of the husking rolls; and

Fig. 10 shows a fragmentary sectional elevation taken on the line 10—10 of Fig. 6, looking in the direction of the arrows.

Figure 1:
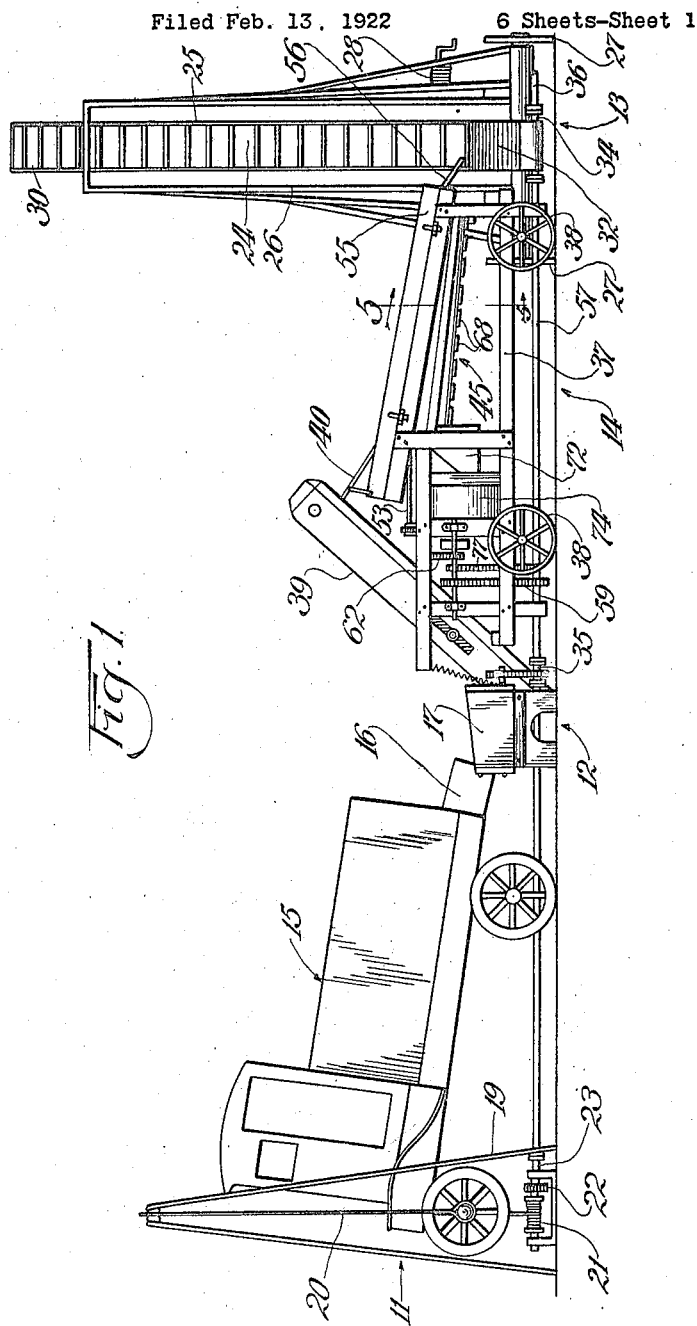
Figure 1 shows a side elevation of a complete wagon elevating, husking, and corn elevating and conveying outfit embodying the features of the present invention.
Figure 2:
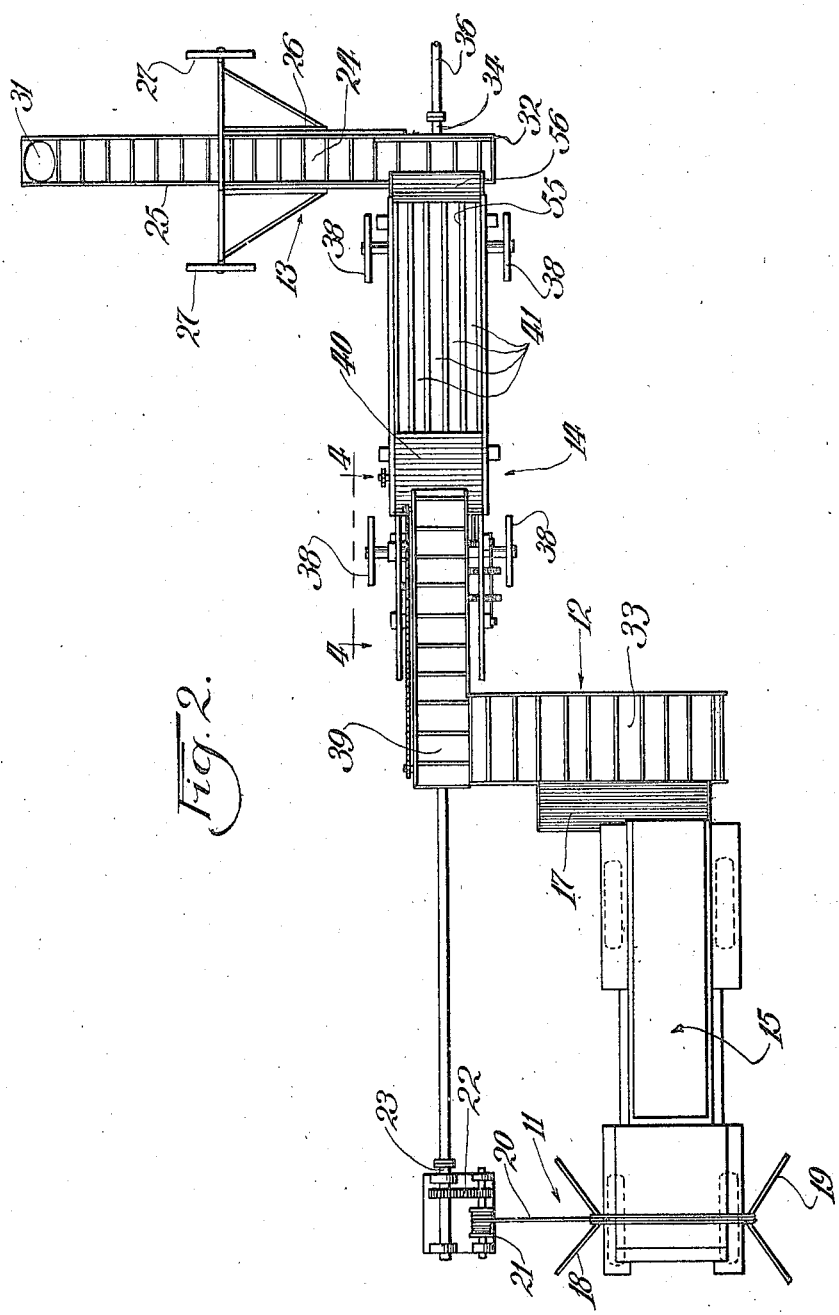
Fig. 2 shows a plan view corresponding to Fig. 1.
Figure 3:
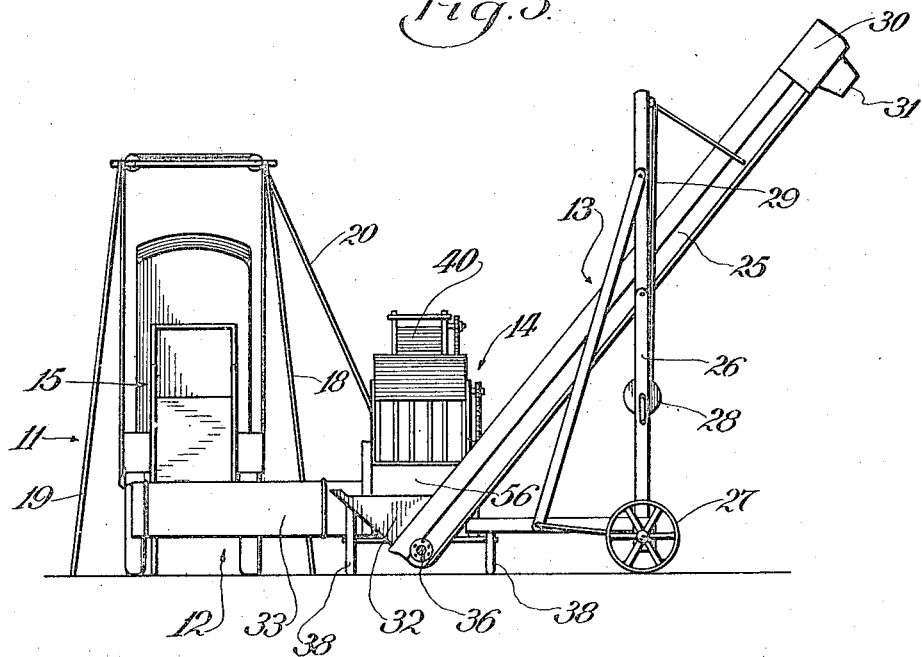
Fig. 3 shows an end view corresponding to Figs. 1 and 2.

Referring first to Figs. 1, 2, and 3, I have therein illustrated the features of the present invention as applied to an outfit including a wagon elevating machine 11, a collecting conveyor 12, and an elevating and conveying machine 13. Interposed between the collecting conveyor 12 and the elevator and conveyor 13 is located the husking machine 14 illustrated in detail in certain of the figures. For purposes of convenience in illustration, I have shown a wagon 15 as occupying the usual position adjacent to the wagon elevator 11 and the collecting conveyor 12. This wagon 15 is shown as provided with a rear chute 16 which is adapted to deliver into the hopper 17 of the hopper conveyor 12. The wagon elevator 11 includes the derricks 18 and 19 adjacent to the front end of the wagon, over which derricks pass the cables 20, which cables may be reeled on a drum 21 driven by suitable gearing 22 from the wagon elevator drive shaft 23.

The elevator conveyor 13 includes a suitable conveying carrier 24 mounted within a frame 25 which is located adjacent a derrick 26. Said derrick is provided with the ground wheels 27 so that it can be conveniently moved from place to place. The derrick is also provided with a drum 28 on which may be reeled a cable 29 by means of which the frame 25 may be raised so that its upper end 30 will deliver the corn through a chute 31 into the bin. The lower end of the frame 25 is provided with a hopper 32 into which the corn is initially delivered before being elevated to the bin.

The corn is initially delivered into the hopper 17 of the hopper conveyor 12. This hopper conveyor is provided with a conveyor 33 by means of which the corn is moved away from the hopper 17 and discharged to the desired point. Ordinarily in the past it has been customary for this conveyor 33 to deliver directly to the hopper 32 of the elevator conveyor 13. The elevator conveyor itself is provided with a through power shaft 34 which, when driven, may operate the conveyor 24 of the elevator conveyor 13. Similarly the hopper conveyor 12 is provided with a through shaft 35 which, when driven, operates its conveyor 33. It has in the past been customary to drive the shafts 34, 35, and 23 in line with each other, and from a common source of power 36.

According to one feature of the present invention, I interpose a corn husker 14 between the hopper conveyor 12 and the elevator conveyor 13, said husker itself being so constructed that it may be conveniently set between the aforesaid elements, and also so constructed that it is provided with a through shaft which may be lined up with the through shafts 34 and 35 of the elevator conveyor and the hopper conveyor, respectively, so that the necessary power for operating the husker may be derived from the same source, for instance, the shaft 36, and so that the necessary sequence of operations in removing the corn from the wagon, husking it, and delivering it to the elevator conveyor may proceed in a natural and regular manner and with the greatest expedition and simplicity.

Figure 5:
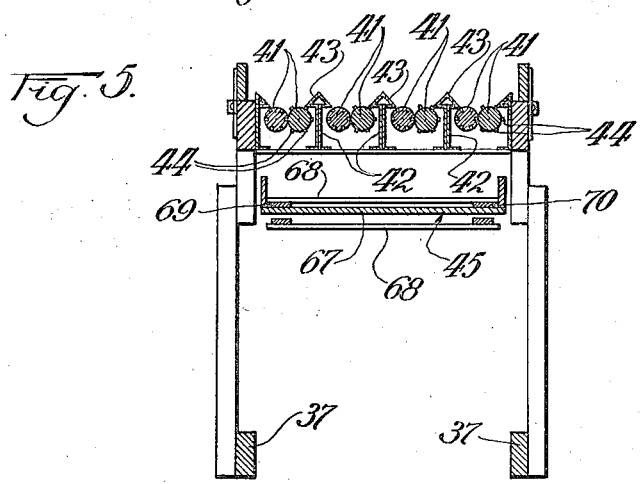
Fig. 5 shows a fragmentary vertical section taken on the line 5—5 of Fig. 1, looking in the direction of the arrows, on enlarged scale.

The husker 14 may be of any suitable construction for accomplishing the foregoing results, but the husker herein illustrated is very well adapted for the present needs. Said husker includes a frame 37 mounted upon ground wheels 38, so that it can be moved around conveniently to the desired location. On the front portion of this frame there is located an elevator 39. The lower portion of the elevator 39 is intended to be located adjacent to the discharge end of the conveyor 33 of the hopper conveyor 12. The upper end of the elevator 39 is located adjacent to and somewhat above a pan 40 and onto which the unhusked corn is delivered, and from which the corn finds its way to the husking rolls 41. These husking rolls may be of any convenient form and arrangement. I prefer, however, to locate them in pairs, as shown in Fig. 5 in particular, and to locate the vertical partitions 42 between the adjacent pairs, the upper portions of the partitions 42 being pointed or ridge-shaped, as shown in Fig. 5, so that the ears of corn will naturally find their way between the different pairs, and will lie parallel to the rolls as the rolls rotate.

The rolls are suitably journaled in the frame of the machine and are provided with prongs or projections 44 in the usual manner which serve to assist in taking hold of the husks and removing them from the ears of corn. The husks are thus drawn between the rolls, the rolls of each pair rotating in opposite directions and towards each other, and the husks are thus drawn downwardly between the pairs of rolls and discharged onto a husk conveyor 45 beneath the rolls.

The rolls themselves are provided with the drive gears 46. The drive gears of each pair of rolls mesh directly together, so that the rolls of the pair are simultaneously driven in opposite directions. Other gears 47, 48, 49, 50, 51, and 52 connect up the rolls of the different pairs in a continuous series, so that the entire set of rolls can be driven from a single drive shaft 53. A universal joint 54 is provided in this drive shaft, since the shaft 53 ordinarily occupies a different alignment from that of the rolls themselves.

The rolls slant downwardly towards the discharge end 55 of the husker. This discharge end of the husker is provided with a pan or chute 56 by means of which the husked corn ears are directed into the hopper 32 of the elevator conveyor 13.

The husker is provided in its lower portion with a through drive shaft 57, one end of which my be directly coupled to the through shaft 34 of the elevator conveyor 13, and the other end of which may be directly coupled to the through shaft 35 of the hopper conveyor 12. In this way the power is delivered directly through the husker on a series of shafts, all of which are aligned in proper manner. The drive shaft 53 for the husking rolls is driven from the through shaft 57 by means of a sprocket 58, chain 59, sprocket 60, sprocket 61, chain 62, sprocket 63, jack shaft 64, and gears 65 and 66. The husk conveyor 45 includes a pan 67 which extends along underneath the rolls, together with a series of slats 68 which are adapted to travel over the top surface of said pan in a reverse direction to the general movement of the ears over the rolls. That is, the slats 68 travel from the discharge end 55 of the husker upwardly towards the pan end 40. The slats 68 are mounted upon a pair of belts 69 and 70 which travel over and under the pan 67 as will be readily understood from an examination of Fig. 10 in particular. These belts 69 and 70 travel over pulleys 71 at the ends of the machine. The pulley 71 at the upper end is driven by a suitable connection from the through shaft 57.

The husks delivered by the husk conveyor 45 find their way into a hopper 72 through which they pass to the central intake opening 73 of a centrifugal blower 74. This blower has a tangential discharge opening 75 through which the husks are discharged away from the husking machine and to a convenient point.

Figure 4:
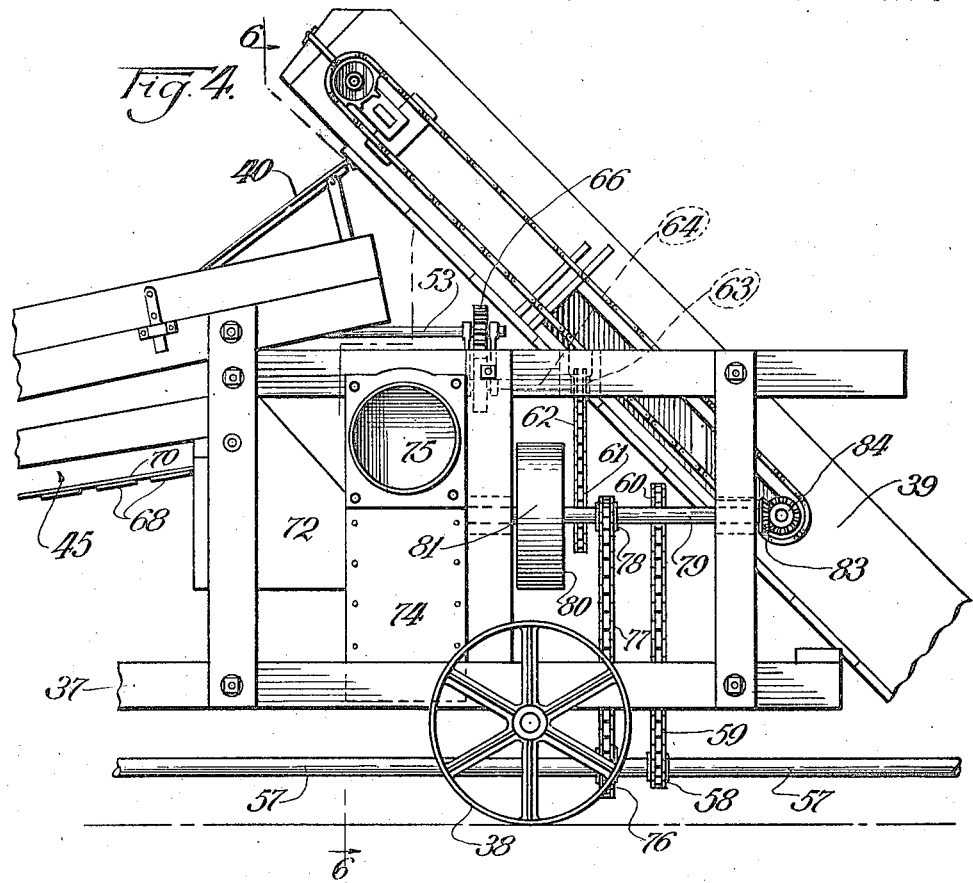
Fig. 4 shows on enlarged scale a fragmentary end view of the blower and associated elements of the husking machine, being taken on the line 4—4 of Fig. 2, looking in the direction of the arrows, but on an enlarged scale.

The blower is driven by suitable connections from the through shaft 57, including a sprocket 76, chain 77, sprocket 78, jack shaft 79, pulley 80, belt 81, and pulley 82. The elevator 39 is also driven by suitable connections from the through shaft 57 including the jack shaft 79 and bevel gears 83 and 84, as shown in Fig. 4. It will be observed that all of the through power shafts of the different mechanisms are joined together by suitable couplings.

While I have herein shown and described only a certain embodiment of the features of my present invention, still I do not limit myself to the same, except as I may do so in the claims.

I claim:

1. A plant for receiving, husking, and conveying and elevating ear corn comprising in combination wagon elevating means, a hopper conveyor adjacent thereto having a hopper for receiving the ear corn delivered by the wagon, husking mechanism including rolls for removing the husks from the corn, an elevator for carrying the unhusked corn from the hopper conveyor to said rolls, and blower means for disposing of husks removed from the corn by the rolls, and an elevator conveyor adapted to receive the husked corn delivered by the husker and raise the same to a suitable delivery point, all of said mechanisms being suitably positioned with respect to each other for the continuous transfer of the corn from the wagon to the elevator conveyor, a through power shaft in the elevator conveyor for operating its elevating and conveying mechanism, a through power shaft in the husking mechanism for operating its elevating and husking instrumentalities, a through power shaft in the hopper conveyor for operating its conveying mechanism, and a through power shaft in the wagon elevating mechanism for operating the same, all of said through power shafts being in alignment with each other, and suitable couplings joining together the power shafts in such alignment, substantially as described.

2. A plant for receiving, husking, and conveying and elevating ear corn comprising in combination wagon elevating means, a hopper conveyor adjacent thereto adapted to receive ear corn delivered by the wagon, husking mechanism including rolls for removing the husks from the corn and an elevator for conveying the unhusked corn from the hopper conveyor to said rolls, and an elevator conveyor adapted to receive the husked corn delivered by the husker and raise the same to a suitable delivery point, all of said mechanisms being suitably positioned with respect to each other for the continuous transfer of the corn from the wagon to the elevator conveyor, through power shafts in the elevator conveyor for operating its elevating and conveying mechanism, in the husking mechanism for operating its elevating and husking instrumentalities, in the hopper conveyor for operating its conveying mechanism, and in the wagon elevating mechanism for operating the same, all of said shafts being in alignment with each other, and suitable couplings joining together said shafts in said alignment, substantially as described.

3. A plant for receiving, husking, and conveying and elevating ear corn comprising in combination a hopper conveyor, husking mechanism including rolls for removing the husks from the corn, and an elevator for carrying the unhusked corn from the hopper conveyor to said rolls, and an elevator conveyor adapted to receive the husked corn delivered by the husker and raise the same to a suitable point, all of said mechanisms being suitably positioned with respect to each other for the continuous transfer of the corn from the hopper conveyor to the elevator conveyor, through power shafts in the elevator conveyor for operating its elevating and conveying mechanism, in the husking mechanism for operating its elevating and husking instrumentalities, and in the hopper conveyor for operating its conveying mechanism, all of said through power shafts being in alignment with each other, and suitable couplings joining together the power shafts in such alignment, substantially as described.

4. A plant for receiving, husking, and conveying and elevating ear corn comprising in combination a hopper conveyor, husking mechanism including rolls for removing the husks from the corn, and an elevator for carrying the unhusked corn from the hopper conveyor to said rolls, and an elevator conveyor adapted to receive the husked corn delivered by the husker and raise the same to a suitable point, all of said mechanisms being suitably positioned with respect to each other for the continuous transfer of the corn from the hopper conveyor to the elevator conveyor, and an aligned power shaft extending through the elevator conveyor for operating its elevating and conveying mechanism, through the husking mechanism for operating its elevating and husking instrumentalities, and through the hopper conveyor for operating its conveying mechanism, substantially as described.

5. A plant for receiving, husking, and conveying and elevating ear corn comprising in combination a hopper conveyor, husking mechanism including rolls for removing the husks from the corn, and an elevator for carrying the unhusked corn from the hopper conveyor to said rolls, and an elevator conveyor adapted to receive the husked corn delivered by the husker and raise the same to a suitable point, all of said mechanisms being suitably positioned with respect to each other for the continuous transfer of the corn from the hopper conveyor to the elevator conveyor, a through power shaft in the elevator conveyor for operating its elevating and conveying mechanism, a through power shaft in the husking mechanism for operating its elevating and husking instrumentalities, and a through power shaft in the hopper conveyor for operating its conveying mechanism, and suitable connections joining together the power shafts in sequence, substantially as described.

ALONZO R. KEELER.